United States Patent [19]

Glen

[11] Patent Number: 5,653,835
[45] Date of Patent: Aug. 5, 1997

[54] METHOD FOR REPAIR OF AUTOMOBILE BUMPERS

[75] Inventor: Peter John Glen, Largo, Fla.

[73] Assignee: International Bumper & Plastics Repair, Inc., Largo, Fla.

[21] Appl. No.: 464,587

[22] Filed: Jun. 5, 1995

[51] Int. Cl.⁶ .................................................. B32B 35/00
[52] U.S. Cl. ........................ 156/98; 264/36; 29/402.18; 29/402.21
[58] Field of Search ...................... 156/94, 98; 264/36; 29/402.06, 402.18, 402.21

[56] References Cited

U.S. PATENT DOCUMENTS

| | | | |
|---|---|---|---|
| 4,677,157 | 6/1987 | Jacobs | 156/331.4 |
| 4,692,195 | 9/1987 | Allen | 156/98 |
| 4,711,746 | 12/1987 | Drader | 264/36 |
| 5,338,611 | 8/1994 | Lause | 156/272.2 |
| 5,435,866 | 7/1995 | Puppin | 264/36 |

*Primary Examiner*—Daniel Stemmer
*Attorney, Agent, or Firm*—Larson & Larson, P.A.; James E. Larson

[57] ABSTRACT

Damaged plastic vehicle bumpers are treated in hot water, heating the plastic further with a heat gun to soften the plastic, joining cracked portions of the bumper with glue, cooling the bumper, sanding it to remove high spots, cutting a v-groove on each side of a severely damaged portion and filling with a bumper plastic and treating the bumper to make it ready to receive a coat of paint.

10 Claims, 3 Drawing Sheets

1

METHOD FOR REPAIR OF AUTOMOBILE BUMPERS

BACKGROUND OF THE INVENTION

1. Field of the Invention

This invention relates to a method for repairing damaged vehicle bumpers. More particularly, it refers to a method for reworking and filling cracks in plastic vehicle bumpers to place them in reusable form.

2. Description of Prior Art

It is common for present day motor vehicles to possess front and rear plastic bumpers designed to absorb shock in a front or rear collision. Such bumpers can withstand impact of from 5 to 15 miles per hour without significant damage. However, more traumatic impact usually results in distortion, cracking, ripping or tearing of the plastic bumper component. Heretofore, such bumpers were removed and replaced with new bumpers at substantial expense. The damaged bumpers were sent to landfills for disposal in most cases. This creates an environmental burden for society. A method for inexpensively repairing damaged bumpers would reduce the cost of repairing damaged vehicles and eliminate the environmental burden caused by disposal of damaged bumpers in landfills.

SUMMARY OF THE INVENTION

A method for inexpensively repairing damaged plastic bumpers has been developed in accordance with this invention. The method steps require cleaning and heating the plastic bumper in a tank, heating the plastic further with a heat gun to soften the plastic, joining cracked portions of the bumper with glue, cooling the bumper, sanding it to remove high spots, cutting out a v-groove on each side of a severely damaged portion, filling the v-grooves with a bumper plastic and treating the bumper to make it ready to receive a boat of paint.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
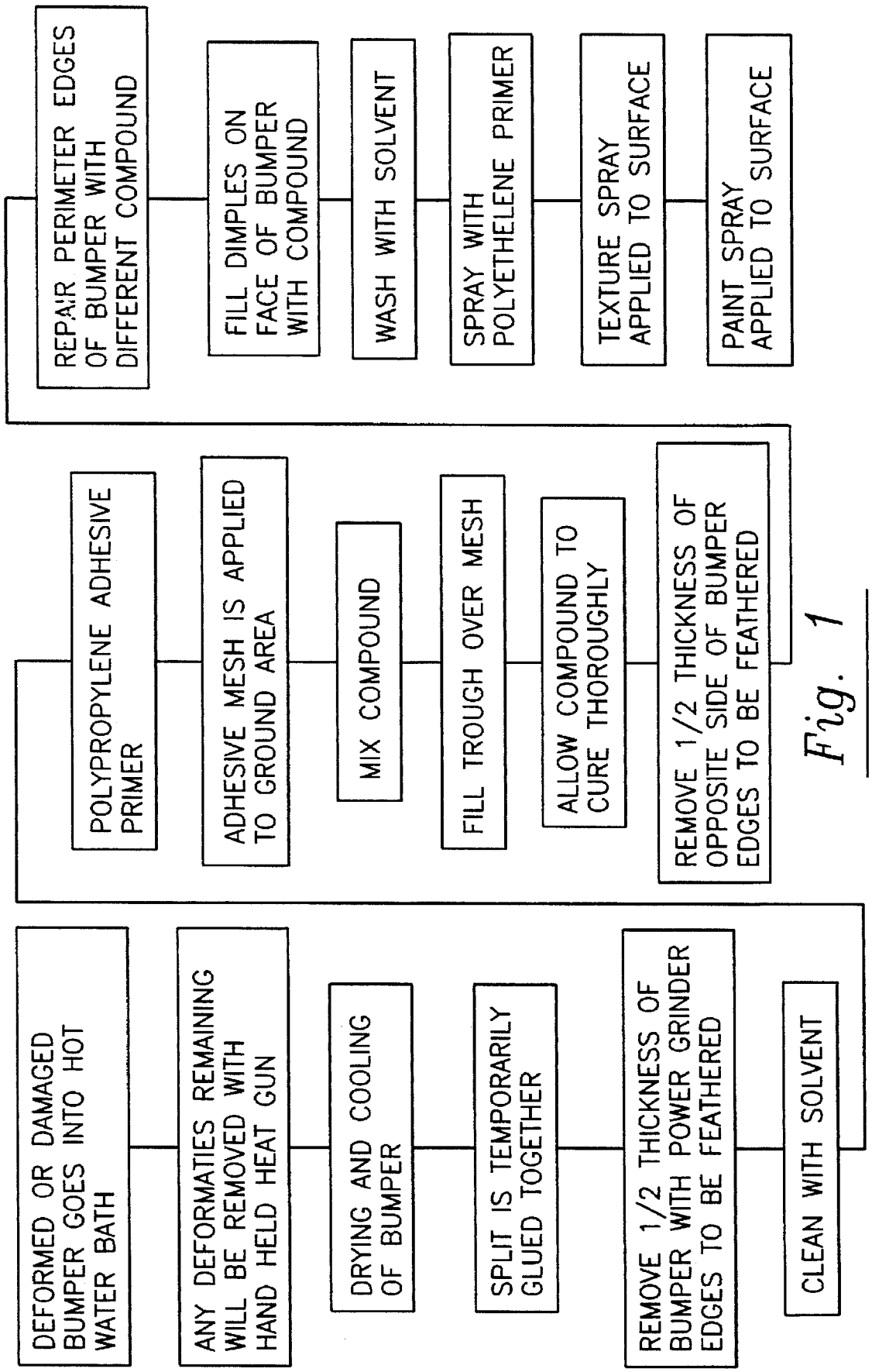
FIG. 1 is a schematic flow diagram showing the method steps of this invention.

Throughout the following detailed description, the same reference numerals refer to the same elements in all figures.

Figure 2:
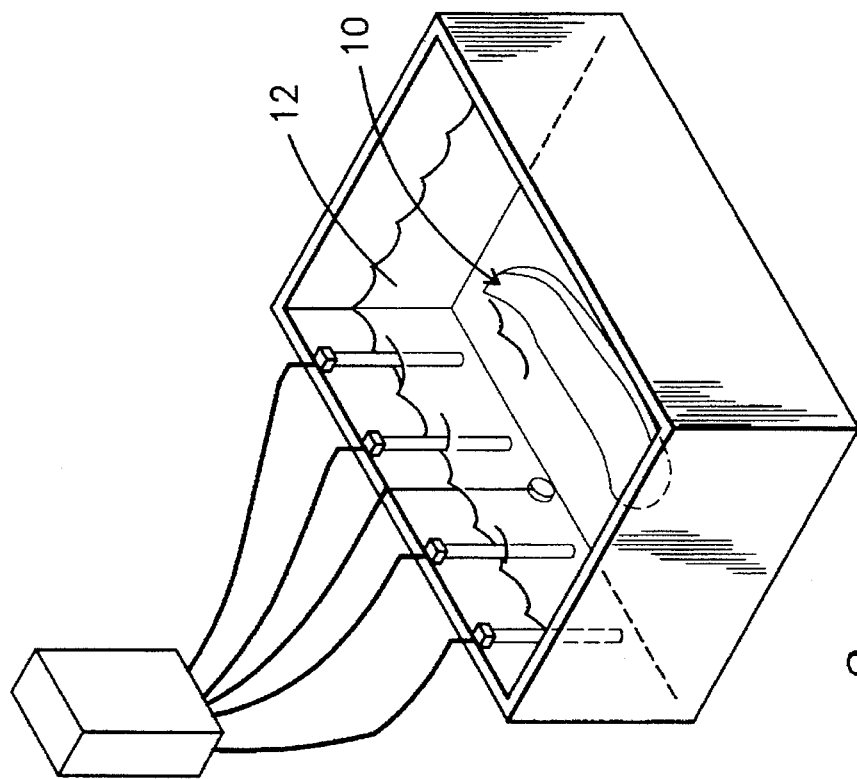
FIG. 2 is a perspective view of the hot water tank used to heat the bumper.

Referring to FIG. 1 for the flow diagram, a deformed, cracked, ripped or torn plastic vehicle bumper 10 is removed from the vehicle and dipped in a hot water bath 12 such as shown in FIG. 2. A water temperature of 160°–200° F. is satisfactory with 180° F. being preferred for most plastics used in making bumpers. Any deformities in shape remaining after the water bath is removed with a heat gun employed at a temperature up to 1000° F. for a polypropylene bumper to soften the plastic and permit it to be manipulated. After all deformities are corrected, the bumper is dried and cooled.

Figure 3:
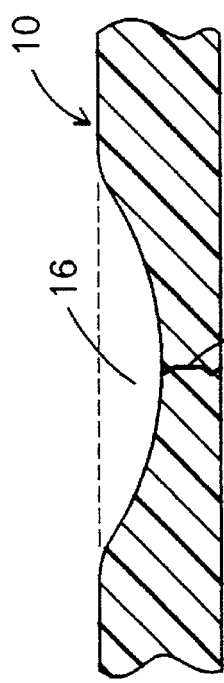
FIG. 3 is a sectional view in elevation of a cracked and dented portion of a bumper.
Figure 6:
FIG. 6 is a sectional view in elevation of a cracked portion of a bumper.

Cracks or splits 14 shown in FIGS. 3 and 6 are glued together by heat welding or gluing. It may be necessary to hold the bumper in a clamp during the drying of the glue. Care should be taken in heat welding to not overheat the bumper to the extent that its shape is changed.

Figure 4:
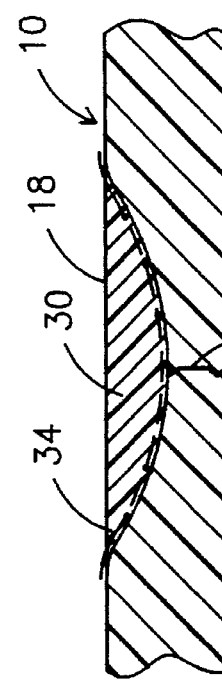
FIG. 4 is a sectional view in elevation of a dented portion of a bumper filled with a plastic repair composition.
Figure 5:
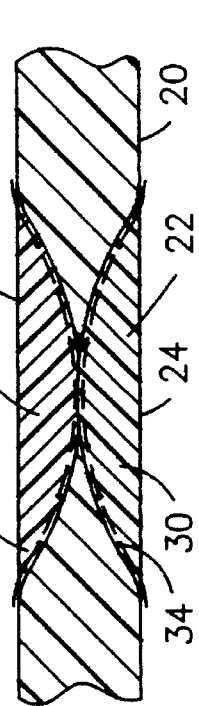
FIG. 5 is a sectional view in elevation of a portion of a repaired bumper.
Figure 7:
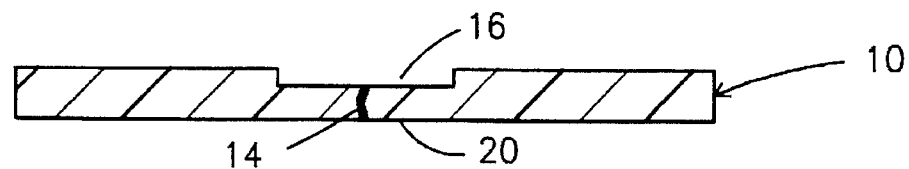
FIG. 7 is a sectional view in elevation of the first step in repairing the cracked portion of the bumper of FIG. 6.
Figure 8:
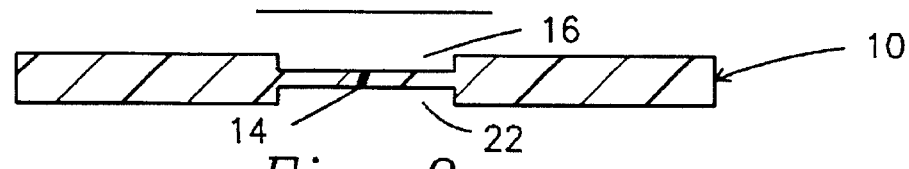
FIG. 8 is a sectional view in elevation of the second step in repairing the cracked portion of the bumper of FIG. 6.
Figure 9:
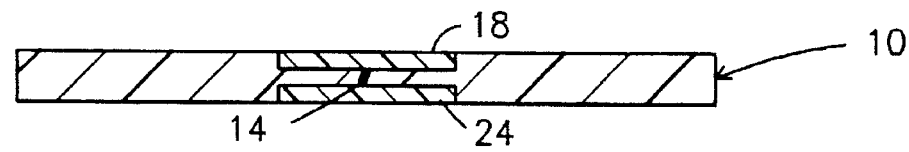
FIG. 9 is a sectional view in elevation of the repaired portion of the cracked bumper of FIG. 6.

As seen in FIGS. 3 and 7 a first groove 16 is ground out of the bumper 10 to one-half its thickness in damaged areas. In FIG. 4 an adhesive mesh 34 is applied to first groove 16 and a semi-rigid plastic 30 is used to fill the depression groove 16. If a broken lug or mounting bracket is being repaired, then a rigid plastic is employed. The preferred semi-rigid plastic is manufactured by DOMINION SURE SEAL, LTD., Mississauwa, Ontario, Canada. The repaired area 18 is sanded into a flat surface. A second side 20 of the damaged area is also ground out to form a second groove 22 which is likewise filled with a semi-rigid plastic 30 and after it sets is sanded to a smooth surface 24.

Any minor depressions in the bumper surface is filled with a spot putty and after setting is sanded flat.

Figure 10:
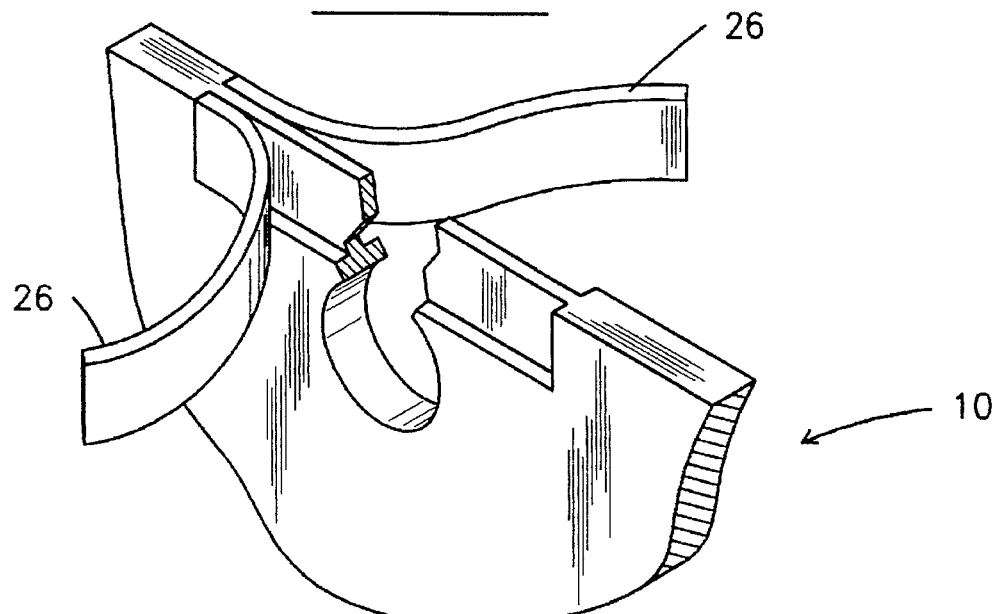
FIG. 10 is a partial sectional view of a portion of a ripped bumper and a step in its repair.

As shown in FIG. 10, a bracket portion of a damaged bumper is repaired in the manner described above, but a strip of polyethylene 26 is glued together over a bore to cover a broken section. The polyethylene strips are inserted into cut out sections of the bumper as shown in FIGS. 6–9.

The following Examples set forth the various embodiments of the method steps of the invention.

EXAMPLE I

Polypropylene Bumpers

Polypropylene bumpers make up a large amount of the bumpers available today along with the rubber modified polypropylene and both of these plastics are weldable. However, the welding rods are not interchangeable (polypropylene rod for polypropylene bumpers and rubber modified polypropylene rods for rubber modified bumpers). Polypropylene bumpers have a release agent incorporated in the plastic rather than the mold from which they are cast and it is this release agent which causes paint and product peeling if it is not prepared properly from the very beginning. Before commencing any work on a bumper, it must be carefully inspected for any damage both inside and outside. The amount of damage must be surveyed and a judgement made as to whether it is better to exchange it for another bumper of less work time to finish. If the trims are damaged, they will have to be removed and any of the trim backing if it remains after removal. When this is done, the bumper must be washed with detergent and water and thoroughly scrubbed of dirt and as much of the road grime as possible. Next, wash with cleaning solution to remove all the wax and silicon from the bumper before any sanding is done. If the trims are good, they can be masked over, but care should be taken so that the tape is pressed on to the trim properly and follows its edge around and is adhering properly here as well. Next, remove any irregularities from the surface by the use of the heat gun. Adjust the temperature and begin to heat the surface taking care not to hold the gun too close or stationary but use slow even movements until the damaged area is hot enough to remove any dents or other irregularities. If the trims are also in a place where there is a dent and it is only shallow, the trim may not have to removed. Apply a few extra coverings of masking tape over the area that is to be reshaped to insulate the trim from any possible heat damage. If the bumper is rubber modified, care must be taken when heating as it will distort and can be difficult to remove. It may also stretch creating a rippled surface. If there are any splits or tears, these will need to be welded together again. If the surface is to be made flat again for instance, along the top of the bar, it is clamped between blocks and allowed to recool. Clamps should not be removed until the work has recooled since deformities may occur as the plastic could move while cooling. If a corner has been pushed in it is heated until pliable and the corner coaxed back out by gentle pressure. The dent must not be pushed out too early or if the plastic is too hot it will cause sagging and an unworkable molten surface. If the dent is pushed out too early, it may not come out properly and further heating will be required. It is unlikely the dent will come out perfectly as the plastic will most likely have been stretched from the impact or while pressing out the surface. Manipulate the surface until satisfied with the shape and allow to cool or use a duster gun and air to cool with only very gentle air pressure. If a corner of a bumper is badly damaged, it can be completely cut off and a new one welded on from another damaged bumper.

With respect to cuts, grind out an area of the width of the plastic around the cut. Next, a rasp is used to flatten any high spots followed by 80 grit paper on a disk sander to remove gouges from the plastic left from rasping. Sand to good level surface appropriate to the area worked on. Follow this up with some 180 grit on the sander to flatten this rougher surface and over any scratches or gouges taking care to remove these properly. When satisfied there are no high areas left, wash the bumper again with a cleaner and spray a coat of poly prime over the entire surface. Whenever sanding back to the surface of the plastic, the surface must be washed and primed again. Allow the surface to dry properly before applying anything to the surface. A heavy coat is not required but an even light coat of prime over the entire surface of the bumper is desirable.

Next, employing a two part epoxy appropriate to the surface, apply it to the ground-out area after applying an adhesive mesh. All hollows, ground-out areas and deep scratches are filled with a two part epoxy filler compound. Allow the epoxy to cure and sand back to create a good even surface. The other side of a ground-out area is treated in the same way after grinding out a second area one half the depth of the plastic. Repair of the inside of the bumper is prepared with washing and poly prime in the same way.

A self adhesive tape is used as a reinforcement for any lugs. If any welding has been done, it will need to be reinforced especially on corners. When the outside of the bumper has been sanded as described, all exposed plastic is washed and poly prime is again applied. Allow to dry and apply a high build primer and allow this to dry. The bumper is now ready for painting.

EXAMPLE II

Polyurethane

Polyurethane is not weldable, so it is repaired with a two part epoxy repair compound. Wash and clean as described above in EXAMPLE I. Polyurethane bumpers can be reshaped with heat. If there are any splits to be rejoined, they are held together and superglued with the activator to speed up the setting time. Gel type superglue in a tube is used on the more open splits. The super glue is only used to hold work together and not as a repair agent. When cured use the air file and make a wide shallow groove along the length of the split on one side only at this time, taking care not to break the glue bond. If this happens then reglue again and continue. When you have finished this groove then wash it with the special cleaner and apply the poly prime. When dry apply a strip of the self adhesive tape along the length of the groove and mix the two part repair and apply filling the groove. Allow to fully cure and repeat this procedure on the reverse side of the split. Repeat this procedure for other repairs like missing lugs, etc. When fully cured sand and finish as described in EXAMPLE I.

EXAMPLE III

Polycarbonate

Wash as described in EXAMPLE I. Polycarbonate will easily distort with too much heat and it is not easy to bring this material back to shape if this should happen. Care is needed in manipulating this plastic. Very gently heat this material until you can just start to bend it, reshape in this manner until satisfied. Polycarbonate is weldable and will weld back to good strength again. However two part repair and tape is still recommended for a really good strong repair. Use the special wash and poly prime as described and finish in the same manner as described in EXAMPLE I.

Having thus described the invention, what is claimed and desired to be secured by Letters Patent is:

1. A method for repairing cracked and dented plastic bumpers, the steps comprising cleaning the entire cracked and dented plastic bumper in a tank containing heated water, heating the entire plastic bumper with a heat gun to soften the plastic, manipulating the heated plastic to remove any deformities in shape in the bumper, grinding away about one-half a thickness of the plastic bumper in a cracked area to form a first ground-away area, cleaning the first ground-away area with a solvent for the plastic, treating the first ground-away area with an adhesive primer, applying an adhesive mesh to the first ground-away area, applying a filler compound appropriate for the plastic in the bumper to fill the first ground-away area permitting the filler compound to set, grinding away one-half a thickness of the plastic bumper opposite the first ground-away area to form a second ground-away area, treating the second ground-away area with an adhesive primer, applying an adhesive mesh to the second ground-away area, applying the filler compound to fill the second ground-away area, permitting the filler compound to set, applying a solvent wash to the entire plastic bumper, and spraying with a primer to prepare the entire plastic bumper for painting.

2. A method according to claim 1 wherein the plastic bumper is a polypropylene bumper.

3. A method according to claim 1 wherein the plastic bumper is a polycarbonate bumper.

4. A method according to claim 1 wherein the plastic bumper is a polyurethane bumper.

5. A method according to claim 1 wherein the plastic bumper is an acrylonitrile butadiene styrene bumper.

6. A method according to claim 1 wherein the water in the tank is 160°–200° F.

7. A method according to claim 6 wherein the water in the tank is about 180° F.

8. A method according to claim 1 wherein the plastic bumper is heated with a heat gun up to 1000° F. until the plastic bumper is softened.

9. A method according to claim 2 wherein the first and second ground-away areas are treated with a polypropylene adhesive primer.

10. A method according to claim 9 wherein a semi-rigid plastic filler compound is used to fill the first and second ground-away areas.

* * * * *